May 25, 1965  L. D. LIVELY ETAL  3,185,845
METHOD OF AND APPARATUS FOR ANALYZING CHEMICAL COMPOUNDS
Filed Feb. 15, 1961  2 Sheets-Sheet 1

INVENTORS
GEORGE M. ROUAYHEB
LAWRENCE D. LIVELY
BY
David P. Cullen
ATTORNEY

May 25, 1965  L. D. LIVELY ETAL  3,185,845
METHOD OF AND APPARATUS FOR ANALYZING CHEMICAL COMPOUNDS
Filed Feb. 15, 1961  2 Sheets-Sheet 2

IONIZATION CURRENT

INVENTORS
GEORGE M. ROUAYHEB
LAWRENCE D. LIVELY
BY
David P. Cullen
ATTORNEY

United States Patent Office 3,185,845
Patented May 25, 1965

3,185,845
METHOD OF AND APPARATUS FOR ANALYZING CHEMICAL COMPOUNDS
Lawrence D. Lively and George M. Rouayheb, Ponca City, Okla., assignors to Continental Oil Company, Ponca City, Okla., a corporation of Delaware
Filed Feb. 15, 1961, Ser. No. 89,464
16 Claims. (Cl. 250—83.6)

This application relates to a method of and apparatus for analyzing chemical compounds and more particularly to methods of and apparatus for making quantitative determinations of the organic constituents of a chemical sample passing through a gas chromatography apparatus by the use of a relatively high energy radioactive source in a detector.

The principles of gas chromatography have been well known in the art since 1952. The original technique employed packed gas-liquid partition columns; these consisted of one-quarter inch columns of diatomaceous earth coated with a partitioning agent such as a heavy paraffin oil. Other workers used packed gas adsorption columns; these were one-quarter inch columns of alumina, silica gel, or other materials which separated the sample components by means of an adsorptive action. Both types of packed columns had unique advantages, the packed gas-liquid partition columns being substantially more flexible and widely applicable. Both types of columns are still in very widespread use today. In 1957 the capillary gas-liquid partition column was designed which utilized the previously known principles of gas chromatography and added enormously to the resolving power of the technique and made gas chromatography applicable to much more formidable samples than theretofore possible. This (capillary) partition column may take several forms; basically, it comprises a capillary tube varying in length from several feet to over a mile, which is ordinarily spiraled due to space considerations, although such spiraling is not necessary to the efficacy of the device. The column is maintained at a temperature sufficiently high to maintain the vaporization of the least volatile constituents of a sample introduced therein. In preparing the column, a liquid solvent is introduced into the tube and allowed to wet the interior thereof throughout its length. Such solvent is chosen on the basis of its relationship to the chemical sample which is subsequently to be analyzed and may be one of numerous materials, including the phthalate esters, ethylene glycols, diethylene glycol ethers, or, in the case of high boiling point petroleum waxes, the asphaltines or silicone gum rubbers, to mention a few. In practice, the solvent chosen will exhibit a lower vapor pressure than the lowest vapor pressure of any of the components of the sample.

Subsequent to the introduction of the solvent into the tube, a carrier-scavenger gas is blown through the tube at a rate of about 0.5 to about 60 cc's. per minute. Although the primary function of this gas is that of carrying the constituents of the chemical sample through the column and into a detector, nevertheless, the gas accomplishes a certain amount of scavenging in the detector, and this is identified through the specification as a "carrier-scavenger" gas. Although a number of rare gases may be practical for this purpose under particular circumstances, commonly helium or argon are used. After this gas has been passed through the column for a period of time ranging from about 20 minutes to about an hour, the sample to be tested is then introduced into the gas stream. This sample may consist of any constituents which may be maintained in a vaporized state at the temperature of the column, which have ionization potentials below the excitation potential of the carrier-scavenger, which have differential solubilities in the liquid phase, and which have differing vapor pressure above that of the liquid phase. Further, the constituents may include only one compound or a number of similar compounds such as a homologous series. Subsequently, the various constituents of the sample tend to be concentrated in different positions along the length of the tube, depending on their relative vapor pressure and relative solubility in the liquid phase solvent therein. These areas of concentration then migrate through the tube due to the action of the carrier gas therein and are ultimately discharged from one end of the tube.

Situated at the discharge end of the tube in a position to receive the gas containing the various sample components is a detector. The detector may be one of several types now in use, such as a thermal conductivity detector, a gas density balance or an ionization detector. An example of one form of this latter type detector was presented by Lovelock in an article entitled "A Sensitive Detector for Gas Chromatography" which appeared in Vol. I, Journal of Chromatography (1958) pages 35–46. However, until the present invention no apparatus of the latter type had been found which produced quantitative results from a gas-liquid partition column.

The present invention provides a method of and apparatus for obtaining quantitative results from a gas chromatographic column, either capillary gas-liquid partition or packed gas-liquid partition or packed gas adsoprtion.

Broadly stated, the invention may be characterized as a method of and apparatus for obtaining improved results from a detector through which various components of a chemical sample pass serially. During the passage of the components therethrough, a portion thereof is ionized by being subjected to a relative high level of radioactive energy while in a strong electrostatic field, to produce a varying, electric current.

In one aspect, the invention may be defined as a method of and apparatus for determining quantitatively the various components of a sample passing serially through a gas-liquid partition column, wherein a portion of such components are ionized in the presence of a carrier-scavener gas by being subjected to a relatively high level of radioactive energy while in a strong electrostatic field. The resulting electric current from the ionization is then measured to determine the percent of the particular component in the sample.

One object of my invention is to provide a method and apparatus of the type described for increasing the utility of an ionizing detector.

Another object of my invention is to provide a method and apparatus of the said type which produces quantitative results from a gas-liquid partition column.

A further object of my invention is to provide an improved method of and apparatus for determining the percent of various constituents of a given sample passing from a capillary column, which determination is made by the use of an increased level of radioactive energy within an ionizing detector.

Other objectives and advantages of the invention will be evident from the following detailed description when read in conjunction with the accompanying drawings which illustrate the invention, where;

Figure 1:
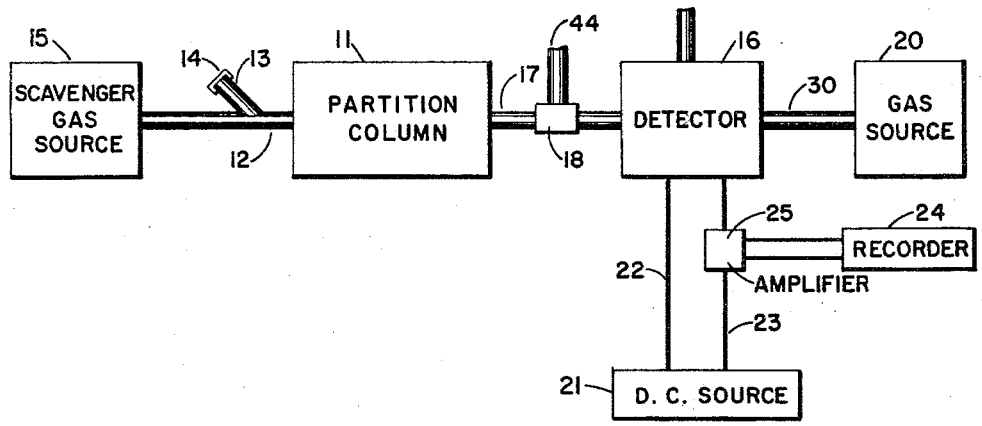
FIGURE 1 is a general schematic diagram of a gas chromatography unit showing its relationship to a detector.

Referring now to the drawings, and in particular to FIGURE 1, there is shown a gas-liquid partition column which is maintained at a temperature sufficiently high to maintain the sample in a vaporized state, indicated generally by 11, which may be any one of several types well known in the art, such as a capillary column or a packed tube. Communicating with the partition column 11 through a suitable passageway 12, which has a sample inlet 13 covered by a cap 14, is a source of pressurized carrier-scavenger gas 15. This gas may be one of the rare gases, the more common of which are helium and argon, with argon usually used. Situated at the opposite end of the partition column is a detector 16 which communicates with the column 11 through a duct 17 having a stream divider 18 through which a portion of the gas from the column 11 is vented through a tube 44, the remainder passing into the interior of the detector 16 and subsequently through a vent 19 therein. A source of radiation of about 300 millicuries or above is contained within the body of the detector, and a source of D.C. potential 21 sufficiently high to produce sufficient metastable argon to ionize adequate amounts of the gaseous constituents to give optimum ionization current is attached to portions of the detector through a pair of leads 22 and 23. Optimum voltage depends upon several factors such as the concentration of the sample and the size and geometry of the chamber; and for this reason no general expression for determining optimum voltage is known. However, a particular voltage chosen for a given set of conditions may be determined by one skilled in the art and is marked by linearity and desired sensitivity of response of the detector. Usually this optimum voltage will be from about 40 to about 3000 volts, although values above and below this range may occasionally be used.

Means for recording or indicating the output current of the detector are shown generally at 24 and may be any of several types well known in the art, such as a simple milliammeter or a pen recorder. Electrically attached to such means may be a D.C. current amplifier 25 such as described by Scroggie in Wireless World, 58 (1952) 14. A source 20 of a suitable gas which is the same type used as the carrier-scavenger may also be placed in communication with the interior of the detector 16 through a conduit 30 for removing the vapor from the column 11 therefrom. It should be understood, however, that such ancillary scavenging may be unnecessary under certain circumstances when the smaller detectors are used.

Figure 2:
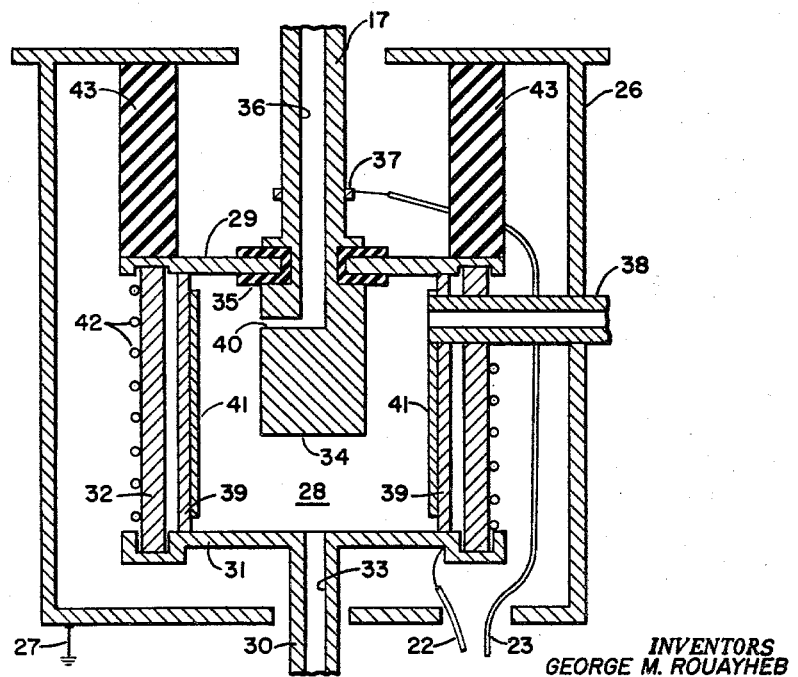
FIGURE 2 is a schematic diagram of one form of a detector which may be used in practicing the invention.

More specifically, the present invention relates to an improvement in the detector indicated generally at 16 and shown in more detail in FIGURE 2. Referring to this figure, there is shown within a housing 26, which is electrically connected to ground as at 27, an ionization chamber 28 which is formed by an upper plate 29, a lower plate 31, and a sleeve portion 32 made of brass or other suitable electrically conducting metal. The volume of the chamber 28 may be varied from about 0.5 to about 10 cc's., depending upon the design chosen. Secured to the bottom plate 31 at an aperture 33 therein is the conduit 30 which extends to the source of the scavenger gas 20 shown in FIGURE 1. Superjacent the aperture 33 is a collecting electrode 34 formed from brass or other suitable metal. The electrode 34 is secured to the upper plate 29 through an insulating washer 35 which may be formed from polytetrafluorethylene or other suitable insulating material. Passing through the center of washer 35 and collecting electrode 34 is a common passageway 36 which communicates with the interior of duct 17 and to chamber 28 through an aperture 40, thus forming an entry port for gases from the column 11. Lead 23 is attached to duct 17 by means of a bushing 37; while lead 22 is electrically connected to the lower plate 31, which is in electrical contact with sleeve 32 and upper plate 29, thus forming an electrode from the walls of chamber 28. It is to be understood, however, that a separate electrode may be provided within the chamber for the purpose. Passing through the walls of the sleeve 32 and the housing 26 is a vent 38 through which gases may escape from the chamber 28.

A pair of upright members 39 are provided within the chamber 28 and have attached thereto a source of radioactivity 41 which is sufficient to produce a current of about $10^{-7}$ amperes or above in the amplifier 25. This source of radioactivity is designed to produce within the chamber 28 a radiation level from about 300 millicuries to about 5 curies, and more commonly will produce from about 400 millicuries to about 2 curies. The source may be composed of any suitable material such as, for example, radium, strontium, or tritium, which will produce the necessary radiation levels. It should be noted that the use of these levels of radiation, which are substantially higher than those utilized in previous apparatus of this type, results in a linear relationship between the ionization current supplied by the detector to amplifier 25 and the amount of gaseous sample within the detector 28. Such a linear relationship makes possible the quantitative analysis of the sample as disclosed below.

One method which has been found satisfactory for producing radioactive sources which give quantitative results when used in a detection chamber of about 2.5 ccs. in volume is as follows. Two platinum foils about two inches by about ¾ inch and about three thousandths of an inch thick were sputtered with titanium to a thickness of about 800 A. These foils were then placed in a test-tube type reaction vessel equipped with a ground glass joint and a stop cock, and the vessel was then evacuated to less than a micron of mercury. After evacuation it was heated to from about 350° to 400° C. and pumped under high vacuum for about 4 hours. A sample containing about 2 curies of tritium was then equilibrated with the vessel containing the foils while maintaining the foils at the elevated temperature. After about 30 minutes the foils were allowed to cool to room temperature. Measurements taken of the radioactive level produced by the tritium on the foils indicated that each foil was capable of producing about 400 millicuries. Foils having higher activity levels may be produced by a similar procedure by increasing the thickness of the platinum foils.

The temperature within the chamber 28 may be maintained at a level adequate to prevent condensation of the incoming vapors, usually from about 50 to about 220° C., by any means well known in the art, an example of which is a heating coil 42 shown wrapped around the exterior of sleeve 32. Sleeve 32 and plates 29 and 31 are isolated from the outer housing 26 by means of suitable insulation 43, which may have the same composition as that of the washer 35.

One example of the use which may be made of a detector of the type described has been presented in an article on page 66 of the issue of Chemical and Engineering News dated February 22, 1960. According to this article as little as 15 parts per billion of some hydrocarbons in air can be analyzed by chromatography in conjunction with this type of a detector.

While the improved detector described above is discussed hereinafter in terms of its primary application, i.e. capillary gas liquid partition chromatography, it is to be understood that the detector is not limited to this application. Rather, it is contemplated that the subject apparatus will give superior results under any conditions wherein the various components of a chemical sample may be passed serially therethrough by a suitable carrier-scavenger gas, without regard to the particular source of such components.

In the use of this device for quantitative analysis, a suitable solvent such as one of those mentioned above is first introduced into column 11, after which a stream of carrier-scavenger gas, usually argon, is introduced into the column and maintained for sufficient time to clear the column of any extraneous material, usually from about 20 minutes to about 1 hour. Subsequently, a chemical sample containing a number of constituents is introduced into the gas stream at 13 through the cap 14. This may be accomplished by the use of a hypodermic needle which can be thrust through the cap 14 without venting the gas within the passageway 12. It should be noted that the optimum sample size for this process is determined by a number of factors such as the length and internal diameter of the capillary column, the temperature of the column, the volume per minute of carrier-scavenger gas passing through the column, the nature of the solvent and other factors known and unknown. For this reason, the optimum sample size for a given apparatus must be determined experimentally using known samples by means well known in the art and within the skill of those versed in the art.

After introduction of the sample into the column 11, the various constituents of the sample are isolated and subsequently pass from the column serially, diffused within the carrier-scavenger gas. This stream is subsequently split by the divider 18, with from about 50 to about 500 ccs. per minute of the stream entering chamber 28 through passageway 36 and aperture 40, with the remainder being vented through the tube 44. Upon entering the chamber 28, the gas-component mixture is subjected to radiation from the source 41 while in a strong electrostatic field produced by the voltage impressed between the walls of the sleeve 32 and the collecting electrode 34. As this happens, a portion of the organic component is ionized, thus creating an electric current of about $10^{-7}$ amperes or above between electrode 34 and the walls of sleeve 32. It is this ionization current that is amplified by D.C. amplifier 25 and recorded at 24 to produce a record such as that shown in FIGURE 3. Subsequently, the area beneath the curve produced by the ionization of each of the constituents and the total area under all the curves is determined by means well known in the art, such as mechanical integration, photoelectric means, by multiplying curve height times half band width, or by counting squares. The area under each of the curves is then divided by the total area to determine the percent by weight of each of the constituents in the sample.

During the time the carrier-scavenger gas with the diffused components therein is entering chamber 28, a scavenging gas from source 20 may be introduced into the chamber through passageway 30. A mixture of scavenging gas, component, and carrier-scavenger gas is formed within the chamber 28 and subsequently passes therefrom through the vent 38. In the detector units wherein an ancillary scavenging gas is necessary, the amount of such gas introduced into the chamber which will give optimum results will depend upon several factors, such as the proximity in time of arrivals between the various constituents of the sample, the rate of flow of the carrier-scavenger gas, the volume of the detector chamber, and the flow geometry of chamber 28. Consequently, it is not possible to express the necessary scavenger flow in a simple mathematical relationship, it being necessary to determine experimentally the optimum scavenger flow for a given apparatus under given conditions. Such optimum scavenger flow may be determined by the use of known samples by means well known in the art and within the skill of those versed in the art.

The constituents which may be effectively detected by this method and apparatus are widely varied in nature, the only limitations as to what may be used being those set forth previously; i.e., the constituents must be vaporized at the temperature of the column, must have differential solubilities in the liquid phase of the column, must have an ionization potential lower than the excitation potential of the carrier-scavenger gas and must have different vapor pressures, and vapor pressures above that of the liquid phase within the column. Thus, in addition to some of the aliphatic, aromatic and alicyclic hydrocarbons, examples of which are presented below, this invention is applicable to many other types of chemical substances.

For example, when used with argon, which has an excitation potential of 11.6, as the carrier-scavenger gas, most of the lower molecular weight organic compounds will produce satisfactory response in the detector (Lovelock, A Sensitive Detector for Gas Chromatography, Journal of Chromatography, Vol. V, pages 35–46). Examples of such organic compounds are the halogenated hydrocarbons, such as methyl bromide, methyl chloride and methyl iodide; the aldehydes, such as formaldehyde; certain esters, such as ethyl acetate; and certain alcohols, such as methanol and ethanol. In addition to the organic compounds, many inorganic compounds will also produce satisfactory results. Examples of such inorganic compounds are the sulfides, such as hydrogen sulfide and carbon disulfide; oxygen compounds such as nitric oxide; nitrogen compounds, an example of which is ammonia; as well as elemental compounds such as iodine.

Even wider application of this invention is provided when pure helium having an excitation potential of about 21.0 is utilized as the carrier-scavenger gas. Under such circumstances additional organic compounds can be detected, as, for example, paraffins such as methane and ethane; alkenes such as ethylene; and alkynes such as acetylene. Further, many of the halides are satisfactory, such as bromine chloride, hydrogen chloride, iodine bromide and iodine chloride. In addition, oxygen compounds such as water, carbon dioxide, carbon monoxide and sulfur dioxide can be detected, as well as elemental compounds, examples of which are nitrogen, oxygen, chloride and hydrogen.

The following examples are presented to further illustrate the invention.

EXAMPLE I

Figure 3:
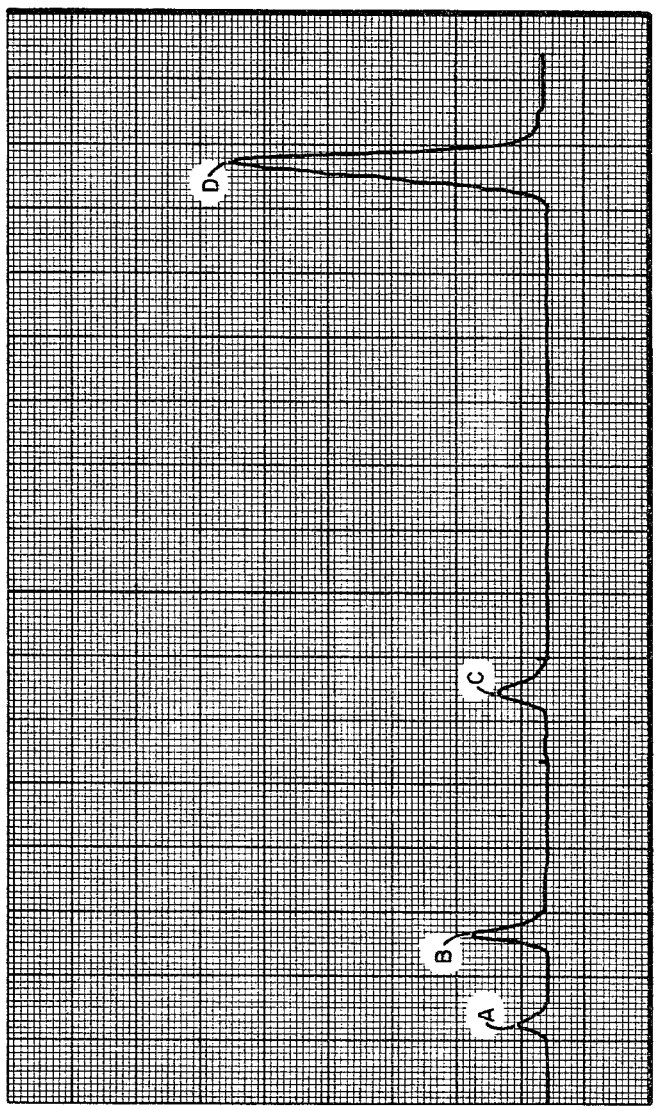
FIGURE 3 is a sample record obtained from the novel structure shown in FIGURE 2 when practicing the invention.

As an indication of the results which may be expected from the increase in radioactivity in the detector, the data in Table 1 is presented. Here a sample consisting of methylcyclopentane, benzene, cyclohexane and n-heptane was introduced into a capillary gas-liquid partition column and subsequently analyzed by a novel detector such as that shown in FIGURE 2. The percent of each of these constituents which was determined beforehand is indicated in the column labeled "Wt. Percent Taken." The column entitled "Area Percent Found" represents the relative percents of the constituents determined from the record shown in FIGURE 3, which was produced from a detector having a level of radiation therein of about 400 millicuries. In determining the figures which appear in the column labeled "Area Percent Found," the peak heights representing the various components of the sample were multiplied by the respective half band widths to determine the area under the curves. Thus, for instance, the peak labeled A in FIGURE 3 represents the record made from the detector when a mixture of carrier-scavenger gas and methylcyclopentane gas was introduced into the cavity 28 from the column 11; and the area under this peak relative to the total area under all the peaks represents the "Area Percent Found." Similarly, peak B represents a mixture of the carrier-scavenger gas and benzene, while peaks C and D were recorded when a similar mixture containing cyclohexane and n-heptane, respectively, were passed through the cavity 28. It may be noted that the scale used in recording peak C was increased by a factor of ten due to the relatively small percent of the cyclohexane component. From this, it may be seen that the highest deviation between experimental component percents and predetermined component percent did not exceed 0.1 percent difference.

*Quantitative analysis of aliphatic, aromatic and alicyclic blends*

TABLE I

| Blend | Wt. Percent Taken | Area Percent Found | Percent Diff. |
|---|---|---|---|
| Methylcyclopentane | 5.0 | 4.6 | 0.4 |
| Benzene | 15.0 | 13.2 | 1.8 |
| Cyclohexane | 1.0 | 1.0 | 0.0 |
| n-Heptane | 79.0 | 81.2 | 1.2 |

EXAMPLE II

Further examples of data obtained from a detector such as that shown in FIGURE 2 have been listed in Table II and were determined in a manner similar to those previously discussed. Here again, it is apparent that while in some instances the percent difference amounted to 1.8, as in Table I, the overall results are still satisfactory for most purposes. It is to be understood, however, that the present novel process and apparatus is not limited to utilization in situations involving the listed chemical compounds, but also may be used to determine the relative percents of a variety of other organic compounds within a given sample.

TABLE II

| Blend | Wt. Percent Taken | Area Percent Found | Percent Diff. |
|---|---|---|---|
| n-Hexane | 25.0 | 26.0 | 1.0 |
| Benzene | 38.0 | 38.0 | 0.0 |
| Cyclohexane | 37.0 | 36.5 | 0.5 |
| 1,1-dimethylcyclohexane | 26.0 | 26.0 | 0.0 |
| n-Octane | 35.0 | 34.2 | 0.8 |
| o-Xylene | 39.0 | 39.8 | 1.8 |
| n-Butylbenzene | 2.6 | 2.5 | 0.1 |
| 2-phenylhexane | 4.6 | 4.0 | 0.6 |
| 1,1-dimethylcyclohexane | 1.8 | 1.8 | 0.0 |
| Methylcyclohexane | 2.1 | 2.1 | 0.0 |
| n-Decane | 66.4 | 66.5 | 0.1 |
| n-Dodecane | 98.5 | 98.4 | 0.1 |

It is obvious that many variations may be made in the apparatus and process of this invention without departing from the spirit of the inventive concept.

The invention having thus been described, what is claimed and desired to be secured by Letters Patent is:

1. The method for determining the relative amounts of the constituents of a chemical sample which comprises the steps of resolving said sample into its various constituents, serially passing said constituents in a vaporized state and in a carrier gas through an electrostatic field, subjecting said gas and constituents to above about 300 millicuries of radiation while said gas and constituents are in said electrostatic field to ionize at least a portion of said constituents, producing a curve representing the levels of ionization in said electrostatic field as each of the constituents pass therethrough and measuring the magnitude of the area under the curve produced by each constituent relative to the total magnitude of the area under the curves produced by all of said constituents.

2. The method defined in claim 1 wherein the radiation is from about 300 millicuries to about 5 curies.

3. The method defined in claim 1 wherein the radiation is from about 300 millicuries to about 2 curies.

4. The method defined in claim 1 wherein the radiation is from about 400 millicuries to about 5 curies.

5. The method for quantitatively determining the constituents of a sample which comprises the steps of introducing a liquid solvent into a length of tubing to wet the interior thereof; passing a stream of gas through said tubing to remove any vapor therein other than the vapor from said liquid solvent; placing a chemical sample comprising a plurality of constituents into said stream whereby said sample is carried through said tubing and said constituents are isolated and emerge from said tubing serially; passing said constituents emerging from said tubing through an electrostatic field, subjecting said constituents and a portion of said gas to above about 300 millicuries of radiation while they are in said field; producing a curve representing the levels of ionization in said electrostatic field as each of the constituents pass therethrough and measuring the magnitude of the area under the curve produced by each constituent relative to the total magnitude of the area under the curves produced by all of said constituents.

6. The method defined in claim 5 wherein the radiation is from about 300 millicuries to about 5 curies.

7. The method defined in claim 5 wherein the radiation is from about 300 millicuries to about 2 curies.

8. The method defined in claim 5 wherein the radiation is from about 400 millicuries to about 5 curies.

9. The method for quantitatively determining the constituents of a sample which comprises the steps of introducing a liquid solvent into a length of tubing to wet the interior thereof, passing a stream of gas through said tubing to remove any vapor therein other than the vapor from said liquid solvent, placing a chemical sample comprising a plurality of constituents into said stream whereby said sample is carried through said tubing and said constituents are isolated and emerge from said tubing serially, passing said constituents emerging from said tubing through an electrostatic field of from about 40 volts to about 3000 volts, subjecting said constituents and a portion of said gas to above about 300 millicuries of radiation while they are within said electrostatic field, producing a curve representing the levels of ionization in said electrostatic field as each of the constituents pass therethrough, measuring the area under each curve so produced, totaling the areas of all the curves and dividing the area under each curve by the total area under all the curves to obtain the percent by weight of the various constituents.

10. The method defined in claim 9 wherein the radiation is from about 300 millicuries to about 5 curies.

11. The method defined in claim 9 wherein the radiation is from about 300 millicuries to about 2 curies.

12. The method defined in claim 9 wherein the radiation is from about 400 millicuries to about 5 curies.

13. In a detector comprising:
   an outer metal housing electrically connected to ground;
   a hollow chamber suspended within said housing and connected thereto by a quantity of insulating material;
   a duct formed of conducting material mounted on and extending into the central interior of the chamber;
   an insulating bushing located between said duct and chamber;
   a conduit passing through said housing and in communication with the interior of said chamber for passing gas thereinto;
   a vent tube passing from the interior of said housing at a point thereon spaced from said duct and said conduit;
   heating means mounted on said chamber for maintaining an even temperature in the interior thereof;
   a pair of upright members mounted within said chamber;
   a foil of radioactive material mounted on said upright members, the surface of said foil being substantially parallel with the surface of the portion of the duct which extends into the chamber;
   a source of D.C. current of from about 40 to about 3000 volts connected to said duct and to the chamber whereby an electrostatic field is created in the interior of said chamber; and recording means in the circuit including said D.C. source, duct, electrostatic field, and chamber for recording variations in the current therein;

the improvement which comprises said foil having a level of radiation above about 300 millicuries.

14. The detector defined in claim 13 wherein said radiation level is from about 300 millicuries to about 5 curies.

15. The detector defined in claim 14 wherein said radiation level is from about 300 millicuries to about 2 curies.

16. The detector defined in claim 15 wherein said radiation level is about 400 millicuries.

References Cited by the Examiner
UNITED STATES PATENTS

| | | | |
|---|---|---|---|
| 2,943,196 | 6/60 | Eickhoff | 250—44 X |
| 2,994,768 | 8/61 | Derfler | 250—83.6 X |
| 3,009,069 | 11/61 | Roehrig | 250—83.6 |
| 3,009,098 | 11/61 | Simons | 250—83.6 X |

RALPH G. NILSON, *Primary Examiner.*

ARCHIE R. BORCHELT, *Examiner.*

UNITED STATES PATENT OFFICE
CERTIFICATE OF CORRECTION

Patetn No. 3,185,845

May 25, 1965

Lawrence D. Lively et al.

It is hereby certified that error appears in the above numbered patent requiring correction and that the said Letters Patent should read as corrected below.

Column 6, line 43, for "chloride" read -- chlorine --.

Signed and sealed this 21st day of December 1965.

(SEAL)
Attest:

ERNEST W. SWIDER
Attesting Officer

EDWARD J. BRENNER
Commissioner of Patents